US009033300B1

(12) United States Patent
Logan

(10) Patent No.: US 9,033,300 B1
(45) Date of Patent: May 19, 2015

(54) ARTIST'S PAINTING SUPPORT STRUCTURE

(71) Applicant: Malcolm Logan, Naples, FL (US)

(72) Inventor: Malcolm Logan, Naples, FL (US)

( * ) Notice: Subject to any disclaimer, the term of this patent is extended or adjusted under 35 U.S.C. 154(b) by 0 days.

(21) Appl. No.: 13/999,540

(22) Filed: Mar. 8, 2014

(51) Int. Cl.
*A47B 97/04* (2006.01)
*F16M 13/02* (2006.01)

(52) U.S. Cl.
CPC .................................... *F16M 13/02* (2013.01)

(58) Field of Classification Search
CPC ...... A47B 97/08; A47B 97/04; A47B 23/044; A47B 97/02; A47B 83/008; F16M 11/00; F16M 11/20; A47G 1/143; A47G 1/142; A47G 1/21; G09F 1/14
USPC .............. 248/441.1, 451, 452, 453, 460, 462, 248/463, 464, 465
See application file for complete search history.

(56) References Cited

U.S. PATENT DOCUMENTS

| | | | | | |
|---|---|---|---|---|---|
| 3,738,606 | A * | 6/1973 | Millen | .......................... | 248/449 |
| 3,759,482 | A * | 9/1973 | Wright | .......................... | 248/449 |
| 4,042,203 | A * | 8/1977 | Warkentin | .................... | 248/449 |
| 4,690,363 | A * | 9/1987 | Koves | .......................... | 248/449 |
| 5,004,204 | A * | 4/1991 | Cook | .......................... | 248/449 |
| 2013/0105659 | A1* | 5/2013 | Panno, Jr. | .................... | 248/448 |

* cited by examiner

*Primary Examiner* — Steven Marsh

(57) ABSTRACT

A support and transport structure for carrying a "painting-in-progress" frame with canvas wherein an artist's painting canvas is stretched over and fastened to the frame, and wherein the structure has a rack having at least one upstanding guide rail which is vertically slotted, wherein clamp means is affixed only to the frame and is isolated from all painted portions of the canvas, and wherein the clamp means has a guide journal structure which slides up or down within the guide slot to maintain the painted surface of the canvas completely isolated from all portions of the rack and clamp means.

8 Claims, 4 Drawing Sheets

ARTIST'S PAINTING SUPPORT STRUCTURE

This invention is directed to a specially designed carrying structure for supporting artistic "Paintings-In-Progress" in an isolated manner, which paintings are in the process of being painted on canvas backing which is stretched over and affixed to a frame of wood, plastic or the like.

PRIOR ART

Heretofore, such framed paintings which are only partially completed and wherein the paint, e.g., oil or lacquer composition is still wet—such materials take hours to dry—present a difficult problem to a person attempting to move the painting from one place to another such as studio to home, since the side and rear edge portions of the frame mounted canvas also typically get painted and are wet to the touch whereby it is impossible to stand the painting on edge, e.g., on the seat of a new BMW without creating, at least, a domestic scene of no small proportions. Many devices have been proposed for solving this transport problem but invariably, through the wet paint on the aforesaid side and rear edge portions of the frame mounted canvas, lead to inopportune, accidental paint smearing of hands, clothing, vehicle interiors, the support device themselves, etc., and thus fail in their usefulness.

SUMMARY OF THE INVENTION

The present invention in one preferred embodiment comprises a transport carrier for a framed artist's "painting-in-progress", wherein a unique frame support clamp means is removably and position adjustably affixed by clamping to a frame member, wherein the clamp means is adapted for use on practically any shape and size picture frame structure and is constructed with substantially parallel, spaced front and rear walls held in spaced relationship by web means affixed to each wall and thus forming a cavity into which the frame member is nested, wherein a screw means is threadedly mounted through the rear wall of the clamp means and engages a rear side of the frame member to clamp the frame member between the aforesaid front wall and the screw means, and wherein the screw means has a pair of axially spaced shoulder means which form a guide follower groove adapted for riding in a guide slot of an upright guide rail of the carrier structure whereby all freshly painted surfaces of the canvas are held in fixed position on the carrier structure and are spaced from and isolated from any part of the carrier structure including the clamp means.

BRIEF DESCRIPTION OF THE DRAWINGS

The invention will be further understood from the drawings wherein and the following description, wherein the various figures are not necessarily drawn to scale or consistent proportions and wherein.

DETAILED DESCRIPTION

Figure 2:
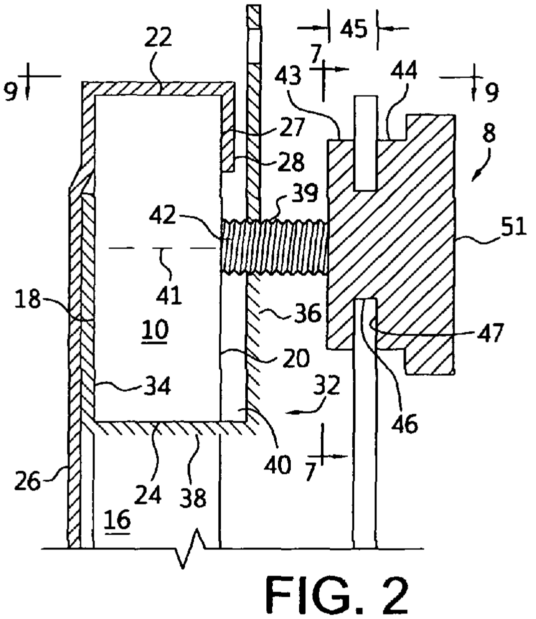
FIGS. 2 and 2A are cross-sectional views taken along line 2-2 in FIG. 1 showing also in cross-section the present clamp means enlarged (for clarity) affixed to a frame member and mounted on an upright guide rail.
Figure 2A:
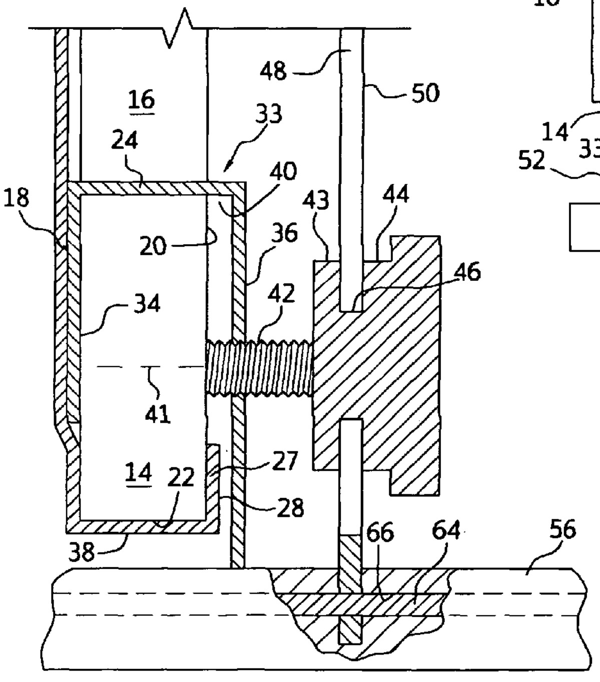

Referring to the drawings and with reference to the claims herein, the present painting carrier structure generally designated 8 carries one or more framed "paintings-in-progress" 9 comprising frame members top 10, side 12, bottom 14, side 16 wherein each member has a front face 18, a rear face 20, an outer edge face 22 and an inner edge face 24 and having an artists canvas 26 stretched over the front face the outer edge face and a tacking surface 27 of the rear face of said members with edge portions 28 of the canvas affixed, e.g., by stapling 30 to surfaces 27 of the frame members. A frame support upper and lower clamp means 32 and 33 is removably and position adjustably affixed to at least one of the frame members and consists of substantially parallel, spaced front 34 and rear 36 walls held in spaced position by web means 38 affixed to each wall and thus forming a cavity 40 into which the member is nested. A screw means 42 is threadedly mounted through rear wall 36 and is adapted to engage the rear face 20 of the frame member to clamp the member between front wall 34 and the screw means. The screw means has a rotation axis 41 and in axial succession an inner threaded section 39, an intermediate section 45 and a torquing section (knob) 51. The intermediate section has a pair of axially spaced and radially extending shoulder means 43 and 44 forming a guide follower journal 46 and guide follower groove 47 adapted for riding in a guide slot 48 of the guide rail 50 having a guide axis 49, of the transport carrying rack 52 which is comprised of the guide rails 50 inserted into nesting cavities 54 in a rack base beam 56 whereby all unintentionally painted surfaces and all paint smudge marks 55 on any edge portions or surfaces of the canvas are held in fixed position in the rack and spaced from and isolated from any part of the present carrier structure.

Figure 1:
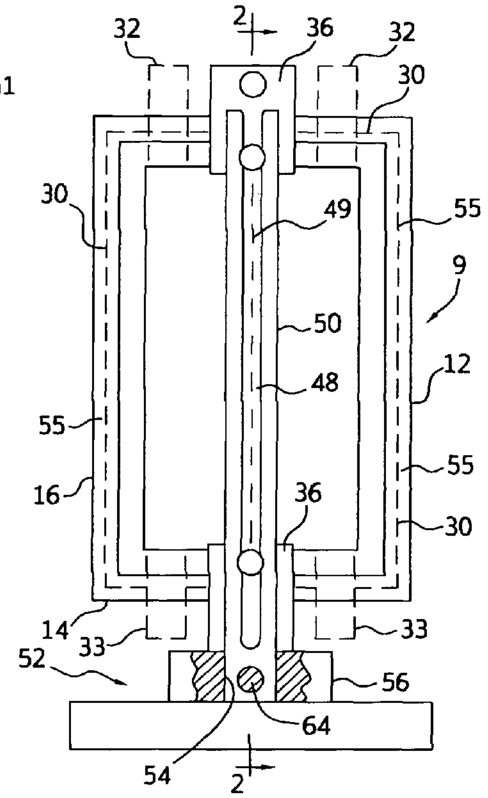
FIG. 1 is a rear view of a painting and frame mounted on a carrying rack and showing in solid lines one preferred placement arrangement of the present unique clamp means and another in dotted lines.
Figure 3:
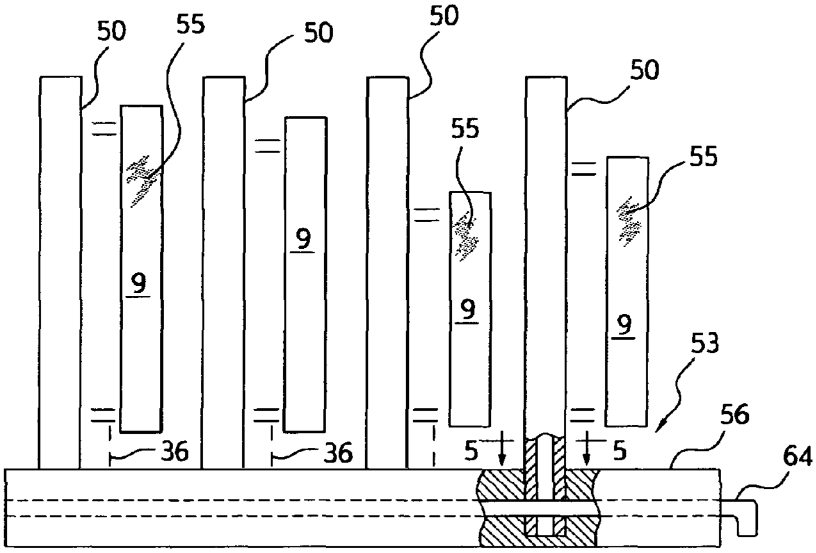
FIG. 3 is a side view of multiple framed paintings-in-progress mounted in a carrying rack of the present carrier structure with portions thereof partially broken away and showing the guide rails in upright mounted position wherein the clamp means is shown only by dotted line.
Figure 4:
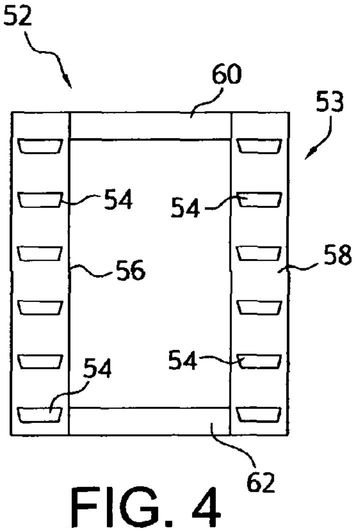
FIG. 4 is a top down view showing the use of two parallel base members (beams) for a carrying rack useful for the present invention wherein, e.g., a clamping means could be provided adjacent each corner portion of the picture frame as shown by dotted lines 22 in FIG. 1.
Figure 5:
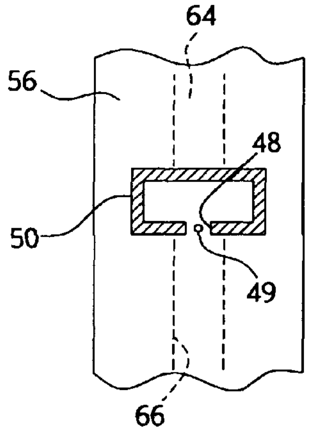
FIG. 5 is a view taken along line 4-4 in FIG. 3 and showing a variation in cross-section of a preferred configuration for the guide rails wherein slot 48 extends the full length of the guide rail.
Figure 7:
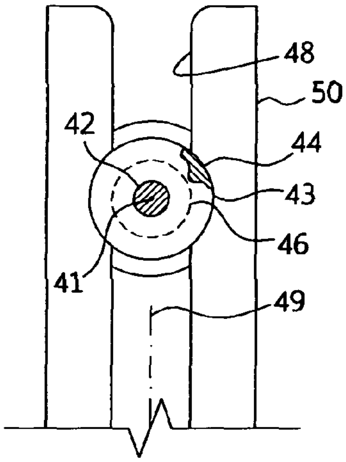
FIG. 7 is a cross-sectional view taken along line 7-7 in FIG. 2.
Figure 8:
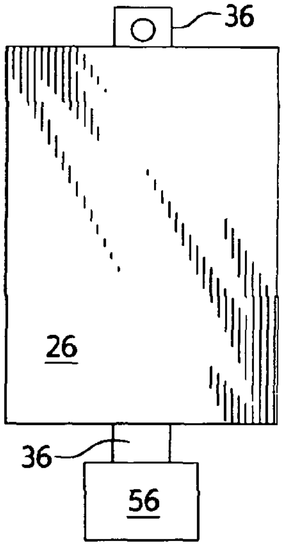
FIG. 8 is a front view of painting mounted on a guide rail.

Referring further to FIGS. 3-5, rack 52, in one useful embodiment and preferably of light weight metal, preferably aluminum, wood or plastic consists of a base 53 having a pair of longitudinal base beams 56, 58 and cross tie members 60, 62 which tie beams 56 and 58 in laterally spaced fixed position. The guide rail nesting cavities 54 preferably are configured and sized such as to tightly but slidingly receive guide rails 50 such that any number of cavities and guide rails may be provided in any number of laterally spaced positions for supporting any number of paintings. For example, the rack of FIG. 4 can be altered to have a center base beam and guide rail as shown in FIG. 1 whereby a top and/or bottom clamp means can also or alternatively be used. Once the guide rails have been inserted into the cavities they are held in place by rods 64 slidably inserted into longitudinally formed bores 66 in beams 56, 58 which pass through holes 68 in the lower ends of the guide rails. For larger carriers, wheels may be provided on rack base 53 for allowing rolling movement of the carrier structure.

Figure 6:
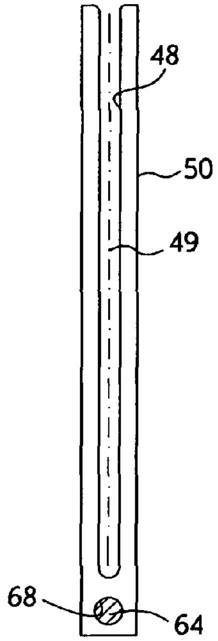
FIG. 6 is a front view of one embodiment of an isolated guide rail.
Figure 9:
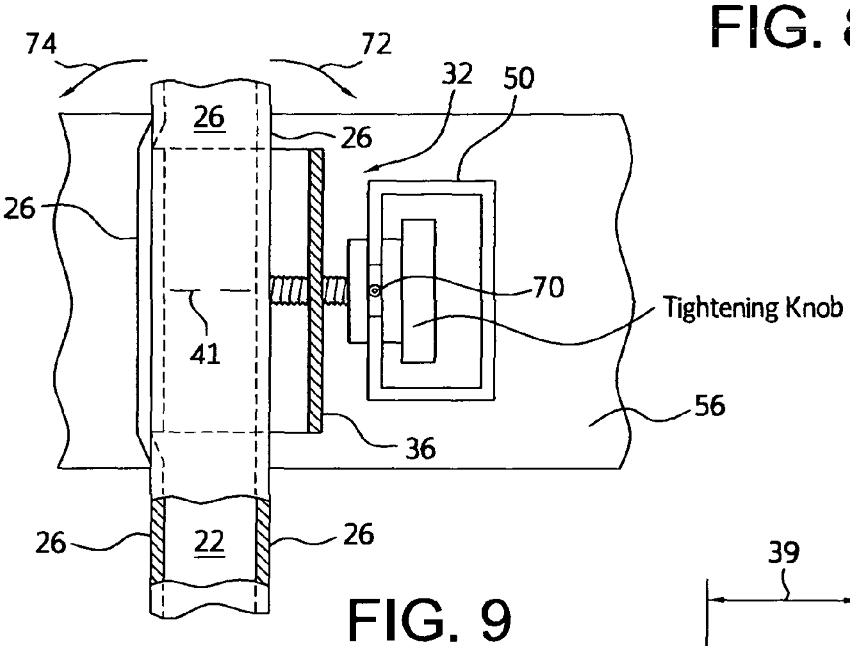
FIG. 9 is a view taken along line 9-9 in FIG. 2 and showing the use of a rectangular guide rail of FIG. 5.
Figure 11:
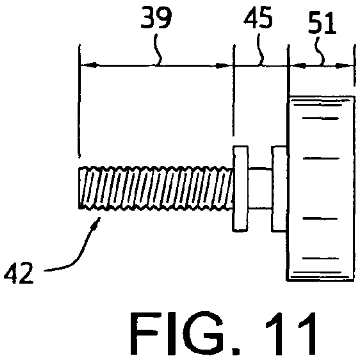
FIG. 11 is an isolated side view of the clamping screw of the present clamp.

The positioning and number of clamp means 32 on the picture frame can be varied, e.g., depending on the lateral distance between beams 56, 58 and the guide rails. See, e.g., the dotted outlines of the clamp means 32 in FIG. 1. Also, the dimensions and configuration of the clamp means can be varied to accommodate, e.g., the thickness of the guide rails and the width of slots 48 therein. For example, where it is desirable to have only one top and one bottom clamp on the frame, the annular shoulder means 43, 44 of the clamp means may be greatly enlarged in diameter and accurately spaced apart from each other to provide a tight but sliding fit along slot 48 in the guide rail to prevent rotation of the painting about vertical axis 70 of slot 48 (FIG. 9), e.g., by the direction lines 72, 74 in FIG. 6 relative to rack base 53.

Figure 10:
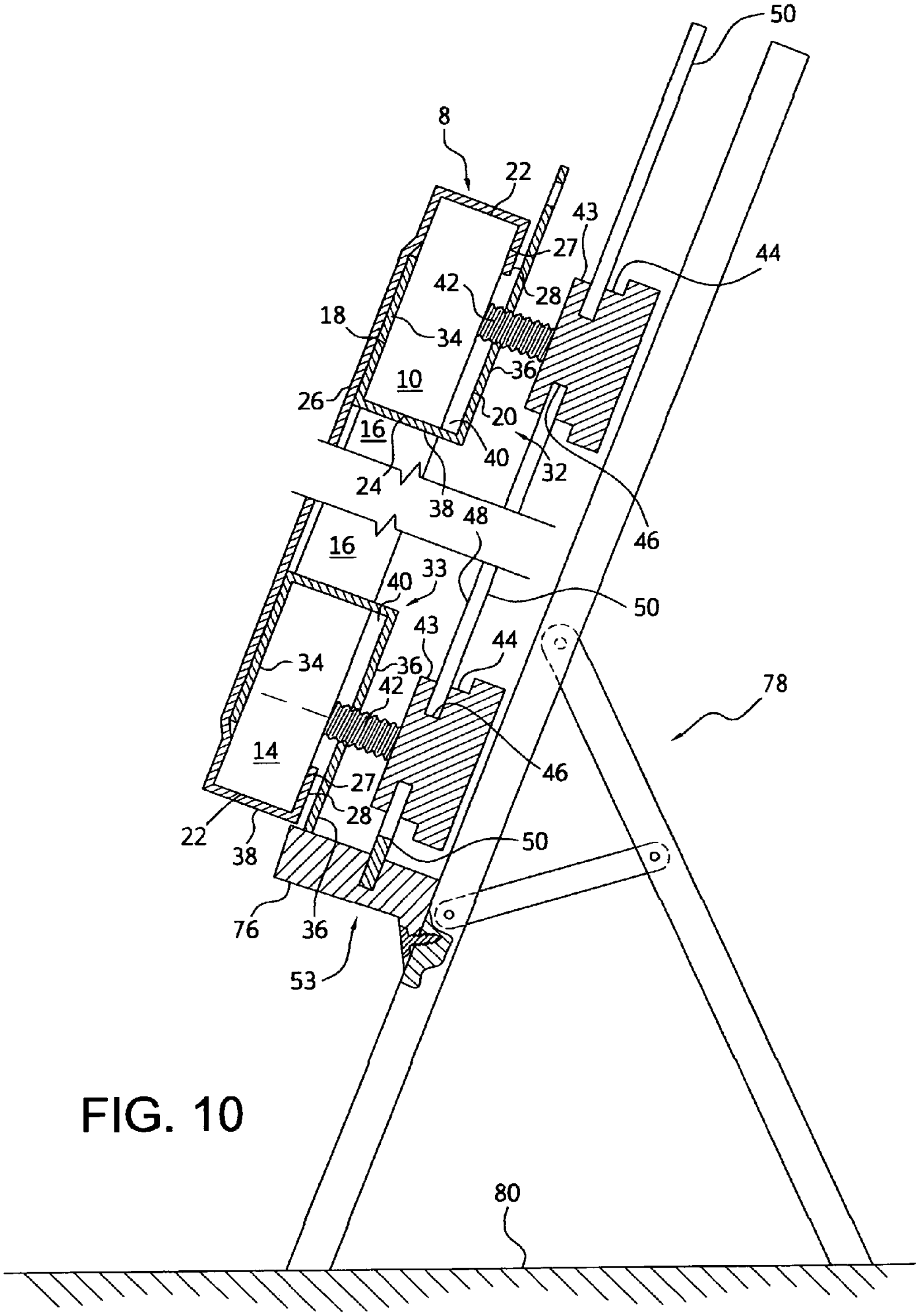
FIG. 10 is a side view of a typical artist's easel supporting a painting according to the present invention.

Referring to FIG. 10 the present carrier structure 8 with a painting thereon is shown mounted on a lateral ledge member 76 spanning the spaced legs of an artists easel 78 (of any design) positioned on a floor or the ground 80 wherein the rear wall 36 of the lower clamp means 33 rests on member 76. As shown by the dotted lines in FIG. 2 any number and lateral positioning of clamps 32 and 33 may be used for this easel embodiment.

The invention has been described in detail with particular reference to preferred embodiments thereof, but it will be understood that variations and modifications will be effected with the spirit and scope of the invention.

I claim:

1. A clamp device for use on a carrier structure for supporting and transporting a canvas painting-in-progress which is affixed to a picture frame having, top, opposing side and bottom members each of which members has a front face, a rear face, an outer edge face, and an inner edge face, wherein each said rear face has a canvas tacking surface and a bare surface portion, wherein an artists canvas is stretched over said front faces, said outer edge faces and said tacking surfaces of said rear faces of said frame members with innermost edge portions of said canvas affixed to said tacking surfaces, wherein said clamp device is adapted to be removably and position adjustably affixed to at least one frame member and is comprised of substantially parallel, spaced front and rear walls held in spaced relationship by web means affixed to each wall and thus forming a channel shaped cavity into which at least one said frame member can be nested with said rear wall of said clamp device being spaced from said rear face of said one frame member and with said front wall of said clamp device being adapted to be inserted between said front face of said one frame member and overlying adjacent portions of said canvas, said clamp device further comprising a screw shaft having a rotation axis and in axial succession an inner threaded section, an intermediate section and an outer torquing section, said threaded section being threadedly mounted through said rear wall for axial movement toward and away from said bare surface portion of said rear face of said one frame member, a pair of annular shoulder means axially spaced from each other on said intermediate section and each extending radially outwardly from opposite ends of an annular journal surface portion of said intermediate section to form an annular guide follower groove for slidably receiving with close tolerances portions of an elongated, substantially upright guide rail stanchion lying adjacent to a longitudinally extending guide slot formed substantially axially in said stanchion of a painting carrier structure whereby all painted surfaces of the canvas are held in fixed position on the carrier structure and spaced from and isolated from any part of the carrier structure.

2. The clamp device of claim 1 wherein said rotation axis of said screw shaft passes through said front wall of said clamp device.

3. The clamp device of claim 2 wherein said shoulder means are integral with said screw shaft whereby threaded axial movement of said shaft through said rear wall of said clamp device will vary the spacing between said rear wall and said guide rail stanchion.

4. A carrier structure for supporting and transporting a canvas painting-in-progress which is affixed to a picture frame having, top, opposing side and bottom members each of which members has a front face, a rear face, an outer edge face, and an inner edge face, wherein each said rear face has a canvas tacking surface and a bare surface portion, wherein an artists canvas is stretched over said front faces, said outer edge faces and said tacking surfaces of said rear faces of said frame members with innermost edge portions of said canvas affixed to said tacking surfaces, wherein said clamp device is adapted to be removably and position adjustably affixed to at least one frame member and is comprised of substantially parallel, spaced front and rear walls held in spaced relationship by web means affixed to each wall and thus forming a channel shaped cavity into which at least on said frame member can be nested with said rear wall of said clamp device being spaced from said rear face of said one frame member and with said front wall of said clamp device being adapted to be inserted between said front face of said one frame member and overlying adjacent portions of said canvas, said clamp device further comprising a screw shaft having a rotation axis and in axial succession an inner threaded section, an intermediate section and an outer torquing section, said threaded section being threadedly mounted through said rear wall for axial movement toward and away from said bare surface portion of said rear face of said one frame member, a pair of annular shoulder means axially spaced from each other on said intermediate section and each extending radially outwardly from opposite ends of an annular journal surface portion of said intermediate section to form an annular guide follower groove, a carrier rack having base means from which at least one guide rail stanchion extends upright therefrom, wherein said stanchion is formed with a guide slot extending lengthwise of said stanchion, wherein said guide follower groove receives with close tolerances portions of said guide rail stanchion lying adjacent to said guide slot formed in said guide rail stanchion whereby all painted surfaces of the canvas are held in fixed position on the carrier structure and spaced from and isolated from any part of the carrier structure.

5. The structure of claim 4 wherein said rotation axis of said screw shaft passes through said front wall of said clamp device.

6. The carrier structure of claim 5 wherein said base means comprises at least one beam member having a nesting cavity into which a lower end of said guide rail stanchion is inserted and held in an upright posture for receiving in its slot means the journal groove of a clamp means which is inserted into said slot means through the open top thereof.

7. A clamp device for use on a carrier structure for supporting and transporting a canvas painting-in-progress which is affixed to a picture frame, wherein said clamp device is adapted to be removably and position adjustably affixed to at least one frame member and comprising substantially parallel, spaced front and rear walls held in spaced relationship by web means affixed to each wall and thus forming a channel shaped cavity, a screw shaft having in axial succession an inner threaded section, an intermediate section and an outer torquing section, said threaded section being threadedly mounted through said rear wall for axial movement through said rear wall, wherein a rotation axis of said screw shaft passes through said front wall, a pair of annular shoulder means axially spaced from each other on said intermediate section and each extending radially outwardly from opposite end portions of an annular journal surface of said intermediate section to form an annular guide follower groove for slidably receiving with close tolerances adjacent guide rail portions of a guide slot in a substantially upright guide rail stanchion, of a painting carrier structure whereby all painted surfaces of the canvas are held in fixed position on the carrier structure and spaced from and isolated from any part of the carrier structure.

8. The clamp device of claim 7 wherein said shoulder means are integral with said screw shaft whereby threaded axial movement of said shaft through said rear wall of said clamp device will vary the spacing between said rear wall and said guide rail stanchion.

* * * * *